March 6, 1962 L. J. HEPPNER 3,023,628
IMPACT TOOL
Filed Aug. 1, 1960
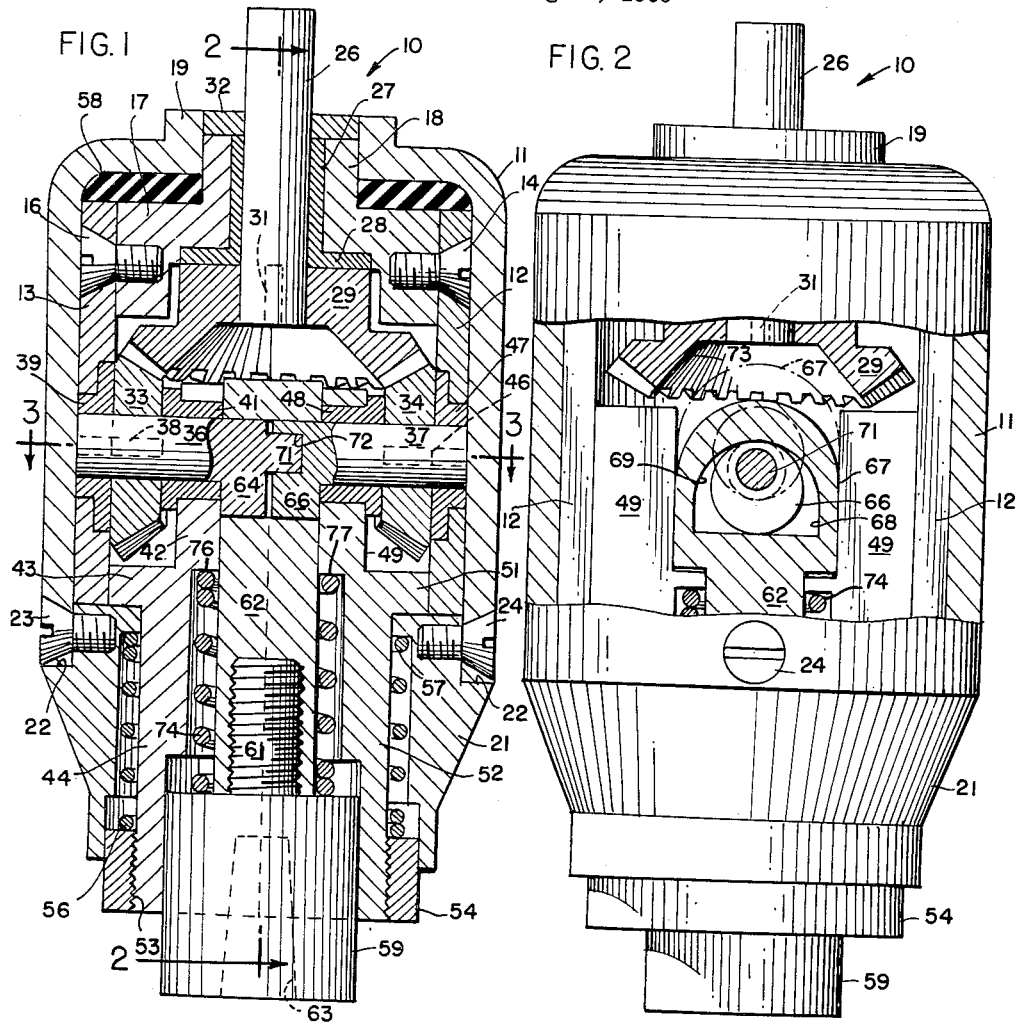
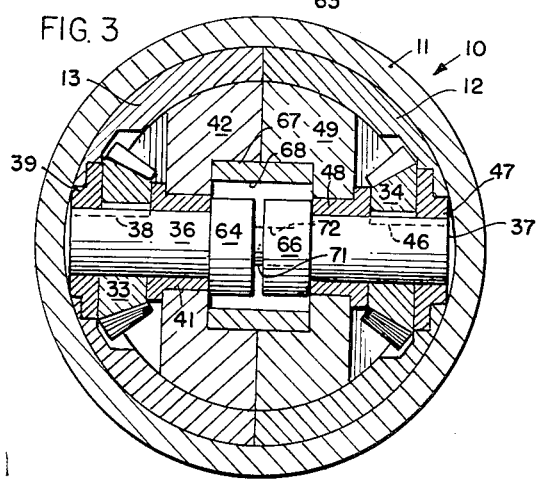
INVENTOR:
LEANDER J. HEPPNER
BY
ATT'YS

United States Patent Office 3,023,628
Patented Mar. 6, 1962

3,023,628
IMPACT TOOL
Leander J. Heppner, 4914 W. Jackson Blvd., Chicago, Ill.
Filed Aug. 1, 1960, Ser. No. 46,458
7 Claims. (Cl. 74—55)

This invention relates generally to impact tools, and more particularly to an impact tool which can be powered from a portable hand drill or the like.

The impact tool according to the present invention is characterized by a drive shaft turning in a support housing, and driving a train of bevel gears supported on a frame enclosed within the support housing. The train of bevel gears includes a pair of driven gears mounted on co-axial shafts supported on the frame and turning in opposite directions. The co-axial shafts are each provided with an eccentric turning in opposite directions and arranged within a yoke and reciprocating member connected to a suitable device for retaining an impact tool bit. A spring is maintained between the yoke and the frame so as to cause the eccentrics to be in contact at all times with the yoke. The frame supported within the housing is provided at each end thereof with structures for absorbing the shock occasioned by the reciprocating movement of the tool bit, and its impact against an object worked upon by the tool.

The frame for supporting the driven bevel gears is composed of two halves, each of which supports one of the bevel gears, these frame halves being adapted to be nested within the housing. By the provision of the frame halves it is possible to transmit the load on each eccentric into its corresponding one of the frame halves and to eliminate substantially any bending stresses upon the shafts supporting the driven bevel gear, and to eliminate substantially any stresses upon the driven gears excepting those occasioned by being driven from the driving gear.

With the foregoing considerations in mind, it is a principal object of this invention to provide an impact machine tool capable of being driven by a portable hand drill or the like.

Another object is to provide an impact tool comprising a bevel gear driving train consisting of a pair of driven bevel gears adapted to turn an eccentric for imparting reciprocating motion to a tool member, and to mount each of the driven gears in a half frame which can be readily assembled within a support housing.

Still another object is to provide an impact tool consisting of a pair of impact producing eccentrics, each of said eccentrics being driven by a bevel gear in opposite directions.

Still another object comprehends the provision of a pair of frames which can be nested within a housing, each of the frames supporting a driven bevel gear and an eccentric driven thereby for imparting reciprocating motion to a tool member.

Other objects and important features of the invention will be apparent from a study of the specification following taken with the drawing, which together describe and illustrate a preferred embodiment of the invention and what is now considered to be the best mode of practicing the principles thereof. Other embodiments of the invention may be suggested to those having the benefit of the teachings herein, and such other embodiments are intended to be reserved especially as they fall within the scope and spirit of the subjoined claims.

In the drawing:

FIG. 1 is a longitudinal sectional view through the improved impact tool of the present invention, certain parts thereof being shown in elevation;

FIG. 2 is an elevational view thereof, certain parts being shown in section, said view looking in the direction of the arrows 2—2 of FIG. 1; and FIG. 3 is a transverse section looking in the direction of the arrows 3—3 of FIG. 1.

Referring now to the drawing, the improved tool according to the present invention is referred to generally by the reference numeral 10, and includes an essentially cylindrical housing 11 enclosing a pair of frame halves 12 and 13, each of which is joined by countersunk screws 14 and 16 to a thrust collar 17 having a flange 18 which is guided within a flange 19 of the housing 11.

The frame halves 12 and 13 are held in position within the housing 11 by means of an annular closure 21 having an annular shoulder 22 which bears against one end of the housing 11. Countersunk screws 23 and 24 are tapped into the annular closure 21 to hold the same to the housing 11.

A driving shaft 26 adapted to be drivably connected to any external power source such as the chuck of a portable hand drill or the like, not shown, turns in a thrust bushing 27 supported in the flange 18 of the thrust collar 17. The thrust bushing 27 has a flange 28 which bears against a bevel gear 29 fast to the shaft 26 by means of a key 31. A closure 32 encircles the shaft 26 and is held between the shaft 26 and the flange 19 of the housing 11.

The driving bevel gear 29 drives bevel gears 33 and 34, respectively mounted upon co-axial shafts 36 and 37. Gear 33 is made fast to the shaft 36 by means of a key 38, and the shaft 36 is supported in a bearing bushing 39 mounted in the frame half 13. The shaft 36 also turns in bushing 41 in turn held in an extension 42 of an inner half frame 43 having a semi-cylindrical extension 44.

Gear 34 is fast to the shaft 37 by a key 46, and the shaft 37 turns in a bushing 47 mounted in the frame half 12. The shaft 37 also turns in a bushing 48 supported in an extension 49 of an inner frame half 51 mating with the frame half 43. The frame half 51 has a semi-cylindrical extension 52.

The two inner frame extensions 44 and 52 are each threaded as at 53, and a collar 54 is threaded to the lower end of the inner frame extensions 44 and 52. The inner face of the collar 54 forms an abutment for a shock absorbing spring 56 having its other end bottomed against an annular seat 57 formed on the inside of the annular closure 21.

The frame halves 12 and 13, together with the thrust collar 17, are spaced from the housing 11 by means of a resilient disk-like shock absorbing member 58. It will be seen that the frame halves 12 and 13, the thrust member 17 and the inner frame halves 43 and 51 are thus resiliently supported within the housing 11 in such a fashion that any impact forces against the inner frame will not readily be transmitted into the housing 11.

Structure is provided for imparting impact against a reciprocating tool holder 59 having a threaded shank 61 which is threaded to a reciprocating member 62. The tool holder 59 has a recess 63 therein for receiving any suitable tool, not shown.

Structure is provided for giving reciprocating movement to the member 62 and tool holder 59 and accordingly the two co-axial shafts 36 and 37 are respectively provided with cylindrical cam eccentrics 64 and 66. These eccentrics turn within a yoke 67 having an opening 68 therein arranged to provide clearance for the eccentrics 64 and 66 as they turn, and having a semicircular camming surface 69 contacted by the rotating eccentrics 64 and 66.

It may be noted that the shaft 36 supporting the eccentric 64 has an extension 71 therefrom, which is received within a mating recess 72 on the inner end of the shaft 37 to provide for alignment of the two shafts 36 and 37.

As seen more particularly in FIG. 2, the member 62 is given reciprocating motion by the contra-rotating eccentrics 64 and 66, the upper limit of movement of the yoke 67 being shown in dotted outline. Clearance is afforded for the yoke 67 in its upper limit of movement by forming a recess 73 in the driving gear 29.

A spring 74 is arranged to bias the yoke 67 against the eccentrics 64 and 66, and the spring 74 has one end thereof abutting the tool holder 59, its other end abutting shoulders 76 and 77 formed respectively in the inner half frames 43 and 51.

In operating the device according to the present invention, the housing 11 must be held against rotation when shaft 26 is driven. A suitable frame, not shown, may be provided for holding the housing 11 to the frame of a portable electric drill or the like, with which the device of the present invention is adapted to be used. However, the housing 11 can be held in the hand of the operator.

When power is applied to the shaft 26, the driven bevel gears 33 and 34 rotate in opposite directions, eccentrics 64 and 66 turning in correlative directions. The rotation of the eccentrics 64 and 66 causes the member 62 to be reciprocated and when a tool is held in the tool holder 59, a succession of repeated impact blows can be made against an object such as concrete, brick masonry or the like. By reason of the shock absorbing spring 56 and the resilient shock absorbing device 58, the impact will not be felt to any appreciable extent by the operator.

The spring 74 is a "power" spring in that, upon being compressed by upward movement of the member 62, its stored-up force is added to the force of the contra-rotating cams or eccentrics 64—66 as they drive the member 62 to deliver an impact blow. Thus, by varying the strength of the spring 74, the "hitting force" of the tool can be varied, within the capacity of the driving motor, for either heavy duty work, such as chiseling through concrete or cutting a hole in a steel plate, or light duty work such as caulking. As shown, the structure of my improved impact tool readily admits of quick and easy change of the spring 74 by merely unscrewing the tool holder 59 from the member 62.

Although but one specific embodiment of this invention has been herein shown and described, it will be understood that details of the construction shown may be altered or omitted without departing from the spirit of the invention as defined by the following claims.

I claim:

1. In an impact tool, a housing including a powered shaft turning within said housing, a pair of frame halves supported within said housing in confronting relationship, a shaft in one frame half arranged co-axially with a shaft in the other frame half, means for transmitting power from said powered shaft to said last named shafts, an eccentric cylindrical cam mounted on each of said last named shafts, said cams being in face to face relation and one of said shafts having an axial extension rotatively received in an axial recess in the adjacent end of the other shaft, a reciprocating member operatively connected with said eccentrics and adapted to be driven reciprocatingly by said eccentrics, and resilient means biased between said reciprocating member and said inner frame halves for maintaining said eccentrics in contact with said reciprocating member.

2. In an impact tool, a housing including a powered shaft turning within said housing, a pair of frame halves supported within said housing in confronting relationship, a shaft in one frame half arranged co-axially with a shaft in the other frame half, a driving bevel gear mounted on said powered shaft and driven bevel gears coacting therewith mounted on the shafts supported within said frame halves, an eccentric mounted on each of said last named shafts, a reciprocating member operatively connected with said eccentrics and adapted to be driven reciprocatingly by said eccentrics, resilient means biased between said reciprocating member and said inner frame halves for maintaining said eccentrics in contact with said reciprocating member, resilient means biased between one end of said housing and said frame halves, and additional resilient means positioned between said frame halves and said housing for absorbing vibration incident the movement of said reciprocating member.

3. In an impact tool, a housing including a powered shaft turning within said housing, a pair of frame halves supported within said housing in confronting relationship, a shaft in one frame half arranged co-axially with a shaft in the other frame half, means for transmitting power from said powered shaft to said last named shafts, an eccentric mounted on each of said last named shafts, a reciprocating member operatively connected with said eccentrics and adapted to be driven reciprocatingly by said eccentrics, resilient means biased between said reciprocating member and said frame halves for maintaining said eccentrics in contact with said reciprocating member, resilient means biased between one end of said housing and said frame halves, and additional resilient means positioned between said frame halves for absorbing vibration incident the movement of said reciprocating member.

4. In an impact tool, a housing including a powered shaft turning within said housing, a pair of frame halves supported within said housing in confronting relationship, a shaft in one frame half arranged co-axially with a shaft in the other frame half, said shafts meeting in end to end relation at the longitudinal axis of said housing, a driving bevel gear mounted on said powered shaft and driven bevel gears coacting therewith mounted on said shafts supported within said frame halves, an eccentric cylindrical cam mounted on the inner end of each of said last named shafts, a reciprocating member operatively connected with said eccentrics and adapted to be driven reciprocatingly by said eccentrics, said reciprocating member comprising a yoke having a semi-circular opening within which said cylindrical cams are received to rotate in opposite directions, and resilient means biased between said reciprocating member and said frame halves for maintaining said eccentrics in contact with said reciprocating member.

5. In an impact tool, a housing including a powered shaft turning within said housing, a pair of frame halves supported within said housing in confronting relationship, a shaft in one frame half arranged co-axially with a shaft in the other frame half, said shafts meeting in end to end relation at the longitudinal axis of said housing, a driving bevel gear mounted on said powered shaft and driven bevel gears coacting therewith mounted on said shafts supported within said frame halves, inner frame halves having longitudinal extensions therefrom for supporting the inner ends of said last named shafts, an eccentric cylindrical cam mounted on each of said last named shafts between said extensions, a reciprocating member slidably mounted between said extensions to be laterally supported thereby and including a yoke surrounding said eccentrics and adapted to be driven reciprocatingly by said eccentrics, and resilient means biased between said reciprocating member and said inner frame halves for maintaining said eccentrics in contact with said reciprocating member.

6. In an impact tool, a housing including a powered shaft turning within said housing, a pair of frame halves supported within said housing in confronting relationship, a shaft in one frame half arranged co-axially with a shaft in the other frame half, a driving bevel gear mounted on said powered shaft and driven bevel gears coacting therewith mounted on said shafts supported within said frame halves, an eccentric mounted on each of said last named shafts, a reciprocating member including a yoke thereon surrounding said eccentrics and adapted to be driven reciprocatingly by said eccentrics, resilient means biased between said reciprocating member and said frame halves for maintaining said eccentrics in contact with said reciprocating member, resilient means biased between one end of said housing and said frame halves, and additional resilient means positioned between said frame halves and said housing for absorbing vibration incident the movement of said reciprocating member.

7. In an impact tool, a housing including a powered shaft turning within said housing, a pair of frame halves supported within said housing in confronting relationship, a shaft in one frame half arranged co-axially with a shaft in the other frame half, a driving bevel gear mounted on said powered shaft and driven bevel gears coacting therewith mounted on said shafts supported within said frame halves, inner frame halves having extensions therefrom for supporting said last named shafts, an eccentric mounted on each of said last named shafts, a reciprocating member including a yoke thereon surrounding said eccentrics and adapted to be driven reciprocatingly by said eccentrics, resilient means biased between said reciprocating member and said inner frame halves for maintaining said eccentrics in contact with said reciprocating member, resilient means biased between one end of said housing and said inner frame halves, and additional resilient means positioned between said first named frame halves and said housing for absorbing vibration incident the movement of said reciprocating member.

References Cited in the file of this patent
UNITED STATES PATENTS

| | | |
|---|---|---|
| 1,015,732 | Grice | Jan. 23, 1912 |
| 1,040,424 | Salt | Oct. 8, 1912 |
| 2,453,136 | Karweit | Nov. 9, 1948 |
| 2,458,929 | Clark | Jan. 11, 1949 |
| 2,724,573 | Lundquist | Nov. 22, 1955 |
| 2,764,188 | Hoffman | Sept. 25, 1956 |
| 2,780,106 | Lovequist | Feb. 5, 1957 |
| 2,794,621 | Beeson | June 4, 1957 |
| 2,884,842 | Schmitz | May 5, 1959 |
| 2,916,117 | Ondeck | Dec. 8, 1959 |